United States Patent Office 2,824,662
Patented Feb. 25, 1958

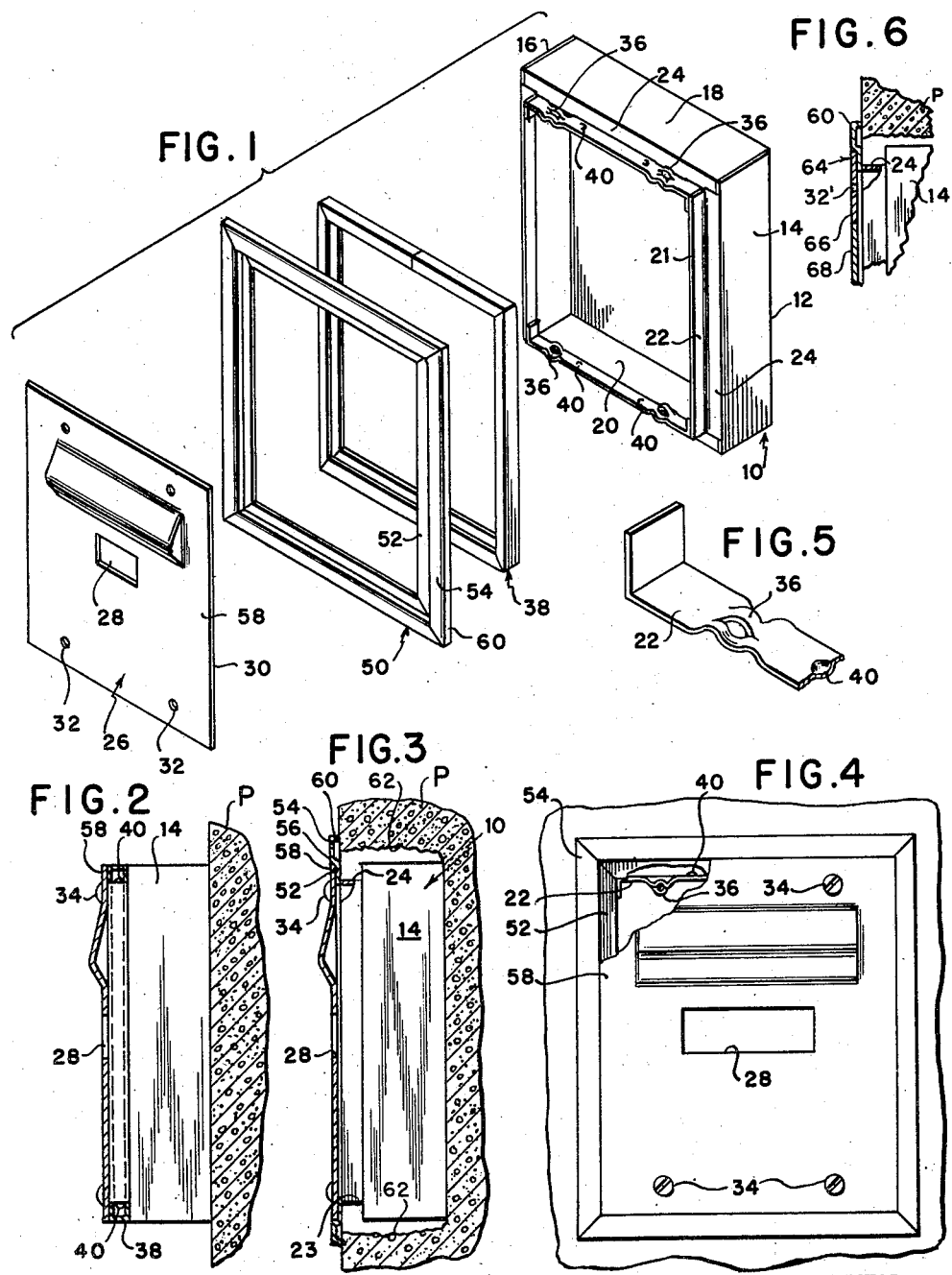

2,824,662

CONVERTIBLE FLUSH AND SURFACE MOUNTABLE PANELBOARD BOXES

Thomas M. Cole, Harrison, N. Y., assignor to Federal Electric Products Company, Newark, N. J., a corporation of Delaware Application November 21, 1952, Serial No. 321,860

4 Claims. (Cl. 220—18)

This invention relates to panelboard boxes or enclosures for electrical instrumentalities such as switches, circuit breakers, fuse boxes and the like, but is not necessarily limited to such applications.

In my Patent No. 2,612,283 issued September 30, 1952, to the assignee of the present application, there is shown and described a panelboard enclosure or box adapted for either surface mounting or flush mounting thereof. When the panelboard box is flush mounted within a recess in a wall, plaster used in finishing the wall is projected into a space or peripheral recess provided for that purpose at the forward part of the box and is overlapped by the marginal edge portion of the front cover of the box. However, when the box is to be disposed in flush mounted relation in an opening in a wall previously finished and thereafter modified to receive the box in question, for example, when it is desired to utilize a larger box than one previously provided in the wall opening and it is necessary to enlarge the wall opening to receive the larger box, the cover or trim member as provided as described in my Patent No. 2,612,283 might not be large enough to completely cover the enlarged wall opening, and overlap the wall around said opening, and a plastering job would be required, therefore, to finish the wall around the larger opening to provide a plaster surface which would be overlapped by the peripheral marginal edge portion of the box cover.

Also, when the box is disposed in flush mounted relation in a dry wall construction, for example, in a wall which is not plastered but has its outer surface formed by prefabricated sheet material, the cover of the box as shown in my Patent No. 2,612,283 might not overlap the portion of the wall around the opening therein, and the wall would not have a finished appearance.

Accordingly the primary aim and object of the present invention is to extend the utility of the invention described in my above-mentioned patent and to provide a convertible flush and surface mountable panelboard box which can be used in flush mounted relation in either new or previously constructed walls of various construction.

Another object of the present invention is the provision, in conjunction with a panelboard box, of an auxiliary device for the flush mounting of said box which is of such construction and which is so related to the construction of the box as to obviate the need for separate fastening means for operatively associating said auxiliary device with said box.

More particularly, pursuant to the above objects of the present invention, the box and the auxiliary device for the flush mounting of said box are so structurally related to each other that said auxiliary device may be positioned on the box and held in position automatically by the securement of the trim member or cover part of the box to the body part thereof.

The above and other objects, features and advantages of the present invention will be more fully understood from the following description considered in connection with the accompanying illustrative drawings.

In the drawings:

Fig. 1 is an exploded perspective view of a panelboard box embodying the present invention;

Fig. 2 is a sectional side elevational view of the panelboard box shown in a surface mounted position;

Fig. 3 is a view similar to Fig. 2 showing the panelboard box in a flush mounted position;

Fig. 4 is a front view of the panelboard box with parts being shown cutaway to reveal structural details;

Fig. 5 is a fragmentary perspective view, on an enlarged scale, of one of the fastening devices of the box; and Fig. 6 is a fragmentary view similar to a portion of Fig. 3 showing a modified form of the present invention.

The features of the present invention as applied to the surface mounting of the panelboard box 10, as shown in Fig. 2, are fully shown and described in Patent No. 2,612,283 issued on September 30, 1952, to Thomas M. Cole and assigned to the assignee of the present application.

In accordance with the present invention the panelboard box 10 is preferably made of sheet steel as usual and is rectangular in shape although it will be understood that box 10 may be of any suitable size and shape. The panelboard box 10 is provided with a back wall 12, side walls 14 and 16, and end walls 18 and 20. The panelboard box 10 has a front opening 21 which is shown as being rectangular in shape for access to any suitable electrical instrumentality (not shown) mounted within said box. The panelboard box or cabinet 10 has a forward inwardly offset peripheral wall portion or rim 22 which preferably extends completely around the box and forms a recess 23 (Fig. 3). The wall portion or rim 22 is preferably integral with the peripherally extending shoulder 24 which is integral with and bent inwardly from the side walls 14 and 16 and end walls 18 and 20.

A trim member or cover part 26 is provided for the front of the box 10 and is provided with an opening 28 for the projection therethrough of operating handles of the electrical instrumentalities disposed within the box. The trim member 26 is preferably of rectangular outline and is dimensioned to substantially correspond to the overall length and width dimensions of the panelboard box 10. It will be understood that the trim member 26 may be of any desired construction, for example, of the construction shown in the aforereferred to patent. It will be noted that the peripheral edge 30 of member 26 is adapted to be positioned laterally outwardly of rim 22 and as here shown preferably extends to and terminates at the planes of side walls 14 and 16 and end walls 18 and 20. The trim member 26 has a marginal edge portion 58 which overlaps the recess 23 in the flush mounted position of box 10 in a manner to be described in detail hereinafter. Member 26 is provided with a plurality of apertures 32 and is adapted to be removably secured to the box 10, preferably by screws 34 which pass through the apertures 32 and engage the tapped members 36 (Fig. 5) secured to the inner surface of the rim 22 in any conventional manner. The tapped members 36 are preferably formed integral with the rim 22 as best shown in Fig. 5, and it will be understood that said tapped members are spaced corresponding to the spacing of apertures 32 of the trim member 26 and are tapped complementary to screws 34 which constitute the means for fastening the trim member 26 to the box. The box 10 may be provided with suitable openings or conventional knock-outs (not shown) for the passage of electrical wiring to and from the box.

A frame or filler member 38 is provided for use on box 10 when the latter is to be employed in a surface mounted installation as illustrated in Fig. 2. Said frame member 38 is fully illustrated and described in the aforereferred to patent and since it forms no part of the present invention a detailed description of said frame member will not be repeated here. It suffices to state that said frame member desirably fills recess 23 which would otherwise exist as a visibly open space when the box is surface mounted. It will be understood that the frame member 38 is adapted to be removably associated with the box 10 when the latter is used in a surface mounted installation and that said frame member may not be employed at all when the box is used for a flush mounted installation. If desired however the frame member 38 may also be used to fill recess 23 when the box is used for a flush mounted installation. The removable intermediate frame 38 interfits with the inwardly offset peripheral wall portion 22 forming a filler piece for the recess made by the peripherally extending shoulders 24 and the inwardly offset peripheral wall portion 22. The intermediate frame 38 need not be secured to the panelboard box by any extraneous fastening means but is held in place automatically when the trim member 26 is secured to the box in the aforedescribed manner. If desired, provision may be made for holding frame member 38 releasably in place when the trim member 26 is detached from the box and such provision may be constituted by the projections 40 pressed outwardly from the rim 22 in position to engage the frame, said feature being fully shown and described in the aforereferred to patent.

For the flush mounting of the box 10 there is provided an auxiliary device constituted by the adaptor frame 50 which is so structurally related to the box 10 and the trim member 26 that said adaptor frame is held in position automatically by the securement of the trim member or cover part 26 to the box. It will be understood that the adaptor frame 50 is only used for the flush mounting of the box 10, as shown in Figs. 3 and 4, in which case the frame member 38 may or may not be used. The adaptor frame 50 is adapted to interfit with a forward portion of the offset wall portion 22 around the latter externally thereof as shown in Figs. 3 and 4. The frame 50 is preferably constructed of sheet metal and may be of any desired structural formation, said frame comprising an inner peripherally extending marginal edge portion 52 and an outer peripherally extending frame portion 54 which is forwardly offset from the marginal edge portion 52. The trim member 26 is formed structurally complementary to the adaptor frame 50 and said trim member is adapted to be received in the space defined by the shoulders 56 of the peripheral frame portion 54. The securement of the trim member 26 to the box 10 is effective to secure the adaptor frame 50 in position with an outer marginal edge portion 58 of the trim member overlying the inner marginal edge portion 52 of the frame 50. The peripherally extending frame portion 54 of the adaptor frame 50 is adapted to project outwardly of the side walls 14 and 16 and the end walls 18 and 20 a substantial amount, said frame portion also projecting outwardly of the trim member 26 a corresponding amount as will be readily apparent. The frame portion 54 of the frame 50 is adapted to lie in the same plane as the trim member 26 when said frame is assembled to the panel box, as best shown in Fig. 3. The frame portion 54 preferably has its outer marginal edge 60 turned inwardly towards the rear of the box 10 so as to be substantially flush with the rear face of the inner marginal edge portion 52 of the frame 50. It will be further noted that the inner marginal edge portion 52 of the frame 50 is substantially coextensive with the inwardly extending shoulder 24 of the cabinet or box 10 and is spaced forwardly therefrom when said frame is assembled to said cabinet. In the assembled condition of the frame 50 with box 10 and cover member 26 the marginal edge portion 52 of the said frame 50 and the marginal edge portion 58 of the trim member 26 are in abutting relation, and the front face of said member 26 is substantially flush with the front face of the frame portion 54 of frame 50.

Ordinarily it is unnecessary to use the adaptor frame 50 when plaster is introduced into recess 23 when the wall is initially finished or when the opening in the wall is enlarged to receive a larger panelboard box and is subsequently refinished by plastering the wall around the enlarged opening. Apart from this, however, it will be understood that the main purpose of the adaptor frame 50, provided in accordance with the present invention is to make it unnecessary to replaster the wall when the opening is enlarged as indicated at 62 in Fig. 3 to receive a larger panelboard box, and it is also one of the purposes of the provision of trim member 50, to facilitate the use of the box in a dry wall construction in flush mounted relation in an opening in such wall, said trim member overlapping the sheet material around the wall opening. Thus the frame portion 54 of the adaptor frame 50 overhangs the marginal edge 58 of the trim member 26 a substantial amount as best shown in Figs. 3 and 4 to provide a neat and attractive flush mounted installation which effectively conceals the unfinished edges 62 of the opening defined in the wall and which will also effectively conceal unfinished edge portions of an opening defined in a dry wall type of construction. Thus the adaptor frame 50 overhangs the outside edges of the box a substantial amount so as to completely conceal enlarged unfinished openings 62 in either plastered or dry wall types of construction.

With reference to Fig. 6 there is shown a cover part 64 secured to the box with the adaptor frame 50 being secured in position by said cover part. The cover part 64 is similar to cover part 26 except that the former is provided with a door 68 hingedly secured to marginal portion 66, said door being adapted to be opened for access to the interior of the box. Cover part 64 is secured to the box in a manner similar to the securement of part 26 to the box. It will be noted that frame portion 54 of frame 50 is adapted to lie flush with the cover part 64 whereby to provide for a neat and attractive flush mounted installation, when frame 50 and cover part 64 are assembled to the box, as shown in Fig. 6. When as shown in Fig. 2 the box 10 is surface mounted the frame member 38 is disposed in the recess around the rim 22 and is held in position by the securement of the trim member 26 to the box. The trim member 26 and the adaptor frame 50 are thus adapted to be used with the box 10 depending on the particular installation and are held in position automatically by the securement of the trim member 26 to the box 10, thus obviating the need for any other fastening means and facilitating the assembly of the frame member 38 and adaptor frame 50 to the box.

Accordingly the box or cabinet 10 and the auxiliary device 50 used for the flush mounting of said box are so structurally related to each other that said auxiliary device may be positioned on the box and held in position automatically by the securement of the trim member or cover part 26 or 64 of the box to the body part of said box in the manner aforedescribed. The adaptor frame 50, which is of rectangular configuration, may be of one-piece construction if desired or may be formed of a plurality of separate parts suitably welded or otherwise secured to each other. The trim members 26 or 64 and the adaptor frame 50 are so related to each other as to structurally blend and harmonize as to form an aesthetically desirable panel box assembly for flush mounted installations.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent is:

1. A panel box, comprising a cabinet having a continuous peripheral side wall provided with an inwardly extending shoulder having an offset forwardly extending continuous peripheral wall portion defining a front opening, a cover for said front opening removably secured to said peripheral wall portion in position adjacent the front edge of the latter, said cover member being dimensioned so that the outer marginal edges thereof lie in the corresponding planes of said peripheral side wall of said cabinet, said cover and said inwardly extending shoulder defining a space for the reception of plaster when said box is mounted in a wall prior to the portion of said wall being plastered and for the reception of a filler member when the box is mounted on the surface of a wall, and a frame member removably interposed between said cover member and said cabinet adjacent said front opening and having a central opening in registry with said front opening of said cabinet, said frame member having a peripherally extending continuous surface extending laterally outwardly beyond the planes of said peripheral side wall of said cabinet so as to cover the space between said peripheral side wall of said cabinet and the portions of a wall surrounding said cabinet when said cabinet is mounted in a wall opening which is larger than said cabinet so as to overlie the front of the wall around said opening therein, said frame member being held in said interposed position by said cover member when the latter is secured to said cabinet.

2. A panel box, comprising a cabinet having a continuous peripheral side wall provided with an inwardly extending shoulder having an offset forwardly extending continuous peripheral wall portion defining a front opening, a cover for said front opening removably secured to said peripheral wall portion in position adjacent the front edge of the latter, said cover member being dimensioned so that the outer marginal edges thereof lie in the corresponding planes of said peripheral side wall of said cabinet, said cover and said inwardly extending shoulder defining a space for the reception of plaster when said box is mounted in a wall prior to the portion of said wall being plastered and for the reception of a filler member when the box is mounted on the surface of a wall, and a frame member removably interposed between said cover member and said cabinet adjacent said front opening and having a central opening in registry with said front opening of said cabinet, said frame member having a peripherally extending continuous surface extending laterally outwardly beyond the planes of said peripheral side wall of said cabinet so as to cover the space between said peripheral side wall of said cabinet and the portions of a wall surrounding said cabinet when said cabinet is mounted in a wall opening which is larger than said cabinet so as to overlie the front of the wall around said opening therein, said frame member having a rearwardly offset recessed portion complementary to said cover member for reception of said cover member therein, said frame member being held in said interposed relation by said cover member when the latter is disposed in said recessed portion of said frame member and is secured to said cabinet.

3. A panel box, comprising a cabinet having a continuous peripheral side wall provided with an inwardly extending shoulder having an offset forwardly extending continuous peripheral wall portion defining a front opening, a cover for said front opening removably secured to said peripheral wall portion in position adjacent the front edge of the latter, said cover member being dimensioned so that the outer marginal edges thereof lie in the corresponding planes of said peripheral side wall of said cabinet, said cover and said inwardly extending shoulder defining a space for the reception of plaster when said box is mounted in a wall prior to the portion of said wall being plastered and for the reception of a filler member when the box is mounted on the surface of a wall, and a frame member removably interposed between said cover member and said cabinet adjacent said front opening and having a central opening in registry with said front opening of said cabinet, said frame member having a peripherally extending continuous surface extending laterally outwardly beyond the planes of said peripheral side wall of said cabinet so as to cover the space between said peripheral side wall of said cabinet and the portions of a wall surrounding said cabinet when said cabinet is mounted in a wall opening which is larger than said cabinet so as to overlie the front of the wall around said opening therein, the portions of said frame member surrounding said central opening therein abutting against the forward edge of said offset forwardly extending peripheral wall portion of the cabinet, said frame member being clamped in interposed position between said cover and said forward edge when said cover is secured to said cabinet.

4. A panel box, comprising a cabinet having a continuous peripheral side wall provided with an inwardly extending shoulder having an offset forwardly extending continuous peripheral wall portion defining a front opening, a cover for said front opening removably secured to said peripheral wall portion in position adjacent the front edge of the latter, said cover member being dimensioned so that the outer marginal edges thereof lie in the corresponding planes of said peripheral side wall of said cabinet, said cover and said inwardly extending shoulder defining a space for the reception of plaster when said box is mounted in a wall prior to the portion of said wall being plastered and for the reception of a filler member when the box is mounted on the surface of a wall, and a frame member removably interposed between said cover member and said cabinet adjacent said front opening and having a central opening in registry with said front opening of said cabinet, said frame member having a peripherally extending continuous surface extending laterally outwardly beyond the planes of said peripheral side wall of said cabinet so as to cover the space between said peripheral side wall of said cabinet and the portions of a wall surrounding said cabinet when said cabinet is mounted in a wall opening which is larger than said cabinet so as to overlie the front of the wall around said opening therein, said frame member having a rearwardly offset recessed portion complementary to said cover member for reception of said cover member therein, said recessed portion of said frame member being rearwardly offset from said peripherally extending continuous surface thereof a distance equal to the thickness of said cover member, the front surface of said cover member being flush with the front surface of said peripherally extending continuous surface of said frame member when said cover member is disposed in said recessed portion of said frame member, said frame member being held in said interposed relation by said cover member when the latter is disposed in said recessed portion of said frame member and is secured to said cabinet.

References Cited in the file of this patent

UNITED STATES PATENTS

| | | |
|---|---|---|
| 1,117,084 | Phelps | Nov. 10, 1914 |
| 1,197,644 | Lutz | Sept. 12, 1916 |
| 1,206,549 | Lakin | Nov. 28, 1916 |
| 1,796,226 | Tombler | Mar. 10, 1931 |
| 2,422,553 | Johansson | June 17, 1947 |
| 2,612,283 | Cole | Sept. 30, 1952 |
| 2,634,016 | Hagen | Apr. 7, 1953 |